Figure 1:
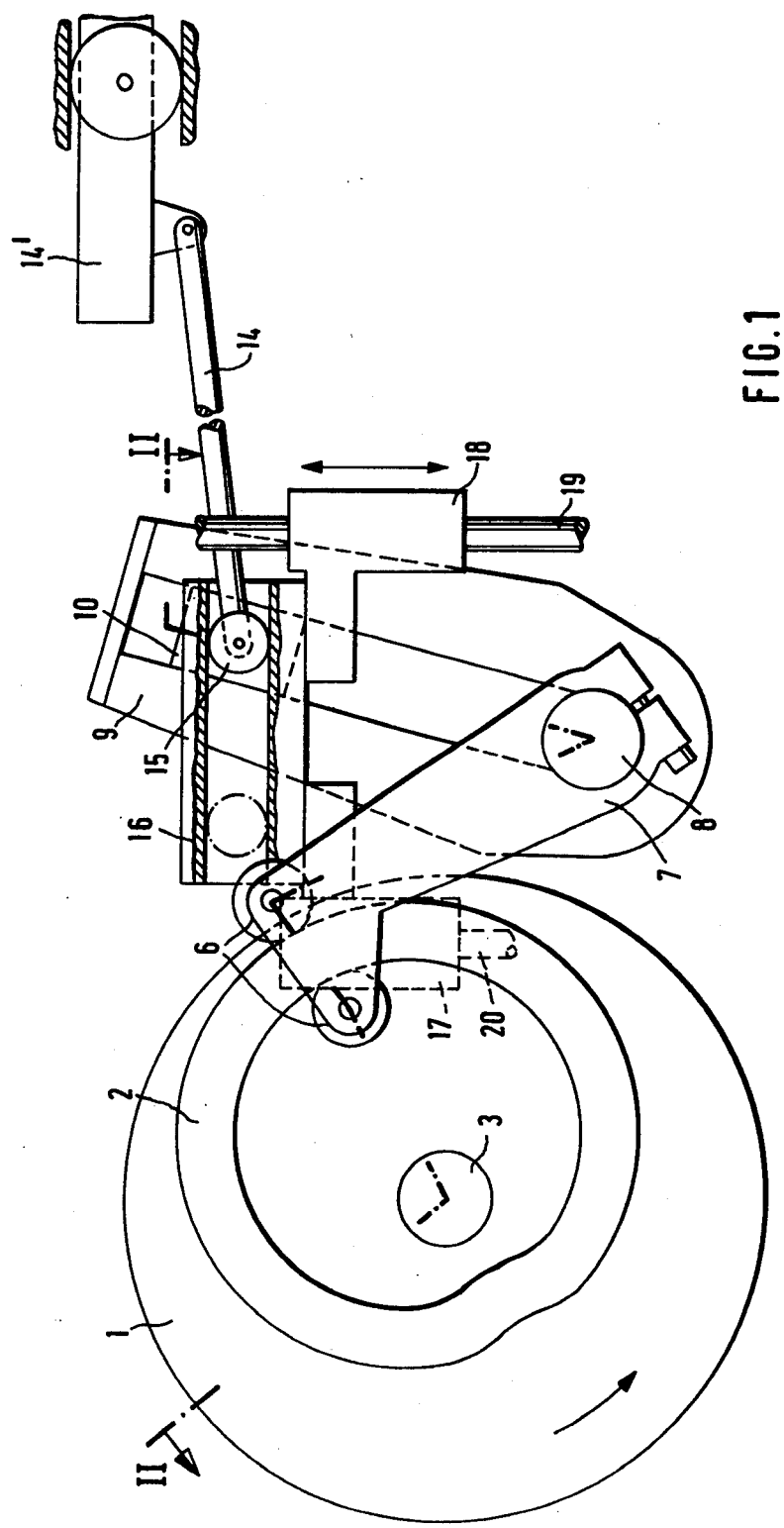

United States Patent [19]

Keller et al.

[11] Patent Number: 4,460,431
[45] Date of Patent: Jul. 17, 1984

[54] APPARATUS FOR FORMING TRANSVERSE SEAM WELDS OR SEPARATED TRANSVERSE SEAM WELDS IN TUBULAR OR SEMITUBULAR PLASTIC FILM WEBS

[76] Inventors: Josef Keller, Lessingstrasse 23, 4540 Lengerich i.W., BRD; Walter Eckhardt, Brandenburger-Strasse 4, 4540 Bramsche, BRD both of Fed. Rep. of Germany

[21] Appl. No.: 442,713

[22] Filed: Nov. 18, 1982

[30] Foreign Application Priority Data

Dec. 1, 1981 [DE] Fed. Rep. of Germany ....... 3147539
Sep. 15, 1982 [DE] Fed. Rep. of Germany ....... 3234227

[51] Int. Cl.³ ...................... B32B 31/18; B32B 31/20
[52] U.S. Cl. .................................... 156/515; 156/553;
156/583.1; 493/193; 493/194; 493/205
[58] Field of Search ............... 156/515, 553, 251, 290,
156/580, 583.1; 493/193, 194, 205

[56] References Cited

U.S. PATENT DOCUMENTS

| 3,758,366 | 9/1973 | Ballestrazzi et al. | 156/515 |
| 3,884,129 | 5/1975 | Monahan | 156/515 |
| 4,317,697 | 3/1982 | McLean | 156/515 |
| 4,371,413 | 2/1983 | Mundus | 156/251 |

FOREIGN PATENT DOCUMENTS 931629 8/1955 Fed. Rep. of Germany .
1147379 4/1963 Fed. Rep. of Germany .

Primary Examiner—Michael G. Wityshyn
Attorney, Agent, or Firm—Fleit, Jacobson, Cohn & Price

[57] ABSTRACT

Apparatus for forming transverse seam welds or separated seam welds in plastic film webs, preferably for making bags, with a transverse welding device having jaws cyclically opened and closed and between which the film web is intermittently advanced when the jaws are open and is held in position during the welding times, and a rocker lever, which by a cam slot and a slide block imparts to the transverse welding device or to the film web a movement in the same or opposite direction to each other, which movement is derived from a rotating eccentric cam wheel.

12 Claims, 4 Drawing Figures

APPARATUS FOR FORMING TRANSVERSE SEAM WELDS OR SEPARATED TRANSVERSE SEAM WELDS IN TUBULAR OR SEMITUBULAR PLASTIC FILM WEBS

This invention relates to apparatus for forming transverse seam welds or separated transverse seam welds in tubular or semitubular plastic film webs, preferably for making bags, comprising a transverse welding device having jaws which are adapted to be cyclically opened and closed and between which the film web is intermittently advanced when the jaws are open and is held in position during the welding times and a rocker lever, which by means of a cam slot and a slide block imparts to the transverse welding device or to the film web a movement in the same or opposite direction, which movement is derived from a rotating eccentric cam wheel.

German Patent Specification No. 931,629 discloses apparatus for manufacturing heat-sealed flat bags, in which a sealing carriage is actuated by a revolving crank pin of a crank to reciprocate relative to a film web, which is continuously advanced. For this purpose the crank pin extends into a cam slot, which is formed in a pivoted lever, which at its free end is coupled by a link to the sealing carriage. This drive imparts to the sealing carriage a sinusoidal reciprocating motion at a velocity which is approximately equal to the velocity of the web only for short times so that only short times are available for the welding of the webs. That time is not sufficient in most cases for making satisfactory sealed seams.

German Patent Specification No. 11 47 379 discloses apparatus which is of the kind described first hereinbefore and in which it has been attempted to prolong the time in which the sealing carriages moves in synchronism with the film web. For this purpose the pin of a revolving crank is guided by a cam slot formed in one arm of a pivoted double-armed lever, the other arm of which is coupled by links and connecting levers to the sealing carriage. The cam slot formed in one arm of the lever is so designed that the sealing carriage does not perform a sinusoidal motion but is moved at the same velocity with the film web for a time which is as long as possible, and the point where the link is pivoted to the other arm can be adjusted so that bags having different widths can be made on the apparatus. That apparatus has the disadvantage that the curvature of the cam slot formed in one lever arms can be optimally selected for a synchronous movement of the sealing carriage and the film web only for a single bag width because for all other bag widths the point where the link for transmitting the pivotal movement is pivoted to the other lever arm must be adjusted so that the link will perform pivotal movements through different angles in dependence on the distance from the pivotal connection of the link to the pivotal axis of the double-armed lever and owing to these different pivotal axis of the double-armed lever and owing to these different pivotal movements of the link the movements imparted to the sealing carriage are not similar to each other. The time during which the sealing carriage is synchronized with the film web will decrease as the pivotal connection of the link is shifted from that point of the lever arm for which the cam slot produces the best synchronism.

It is an object of the invention to provide apparatus which is of the kind described first hereinbefore and in which the welding tools and the film web are synchronized for the longest possible time because their relative motions are proportional regardless of the bag size for which the machine has been adjusted.

This object is accomplished according to the invention in that the lever is provided with a straight radial track, a first slide block is longitudinally guided in said track and is connected by a common pivot to a second slide block, which is movable in a straight slide track, which constitutes the base of a triangle, the legs, of which are defined by the lever in both of its end positions, the slide track is movable parallel to itself and adapted to be fixed in position in the machine frame, and one of the slide blocks has connected to it a lever, which remains parallel to itself and is adapted to transmit the motion to the welding device or to the film web.

Because the second slide block is guided along a straight line, the pivotal movement of the lever has the result that the second slide block performs a radial movement by which the rise of the arc traversed during the pivotal movement is compensated.

As a result, the two slide blocks are guided virtually along a straight line, which is represented by a chord of the arc traversed during the pivotal movement. Because the straight track according to the invention compensates the rise of the arc, the characteristic curve of the cam slot can be properly adjusted to any motion required for the making of bags of different sizes.

The lever connected to one of the slide blocks constitutes a link and may be connected to a carriage, which carries the welding device and which is adapted to be reciprocated by the link in a track which is parallel to the track for the second slide block, which track is rigid with the frame.

The welding device or sealing station may be mounted on a displaceable carriage but a stationary sealing station may also be used in practice. In that case the film web to be provided with the transverse seam weld is intermittently moved adjacent to the sealing station. That intermittent motion is obtained with the aid of a web-storing device, which ensures that the web will not move in the sealing station during the welding time. The web-storing device is controlled in such a manner that in the pinch rollers which precede and succeed the sealing station and rotate continuously the web does not perform differential movements which would give rise to stresses. For this reason the web-storing device must be controlled in such a manner that that portion of the web has been held in position during the welding operation is accelerated to the peripheral velocity of the pinch rollers as quickly as possible but without increasing the stresses in the web. This can be accomplished by the use of dancer rollers, which are moved in mutually opposite directions by a toothed belt or the like, which is driven so as to hold the web exactly at a standstill by means of said dancer rollers. For this purpose the drive of the toothed belt may be derived from the lever which is connected to one of the slide blocks.

According to another proposal the object set forth is accomplished in that the lever is provided with a straight radial track, in which a slide block is longitudinally slidable, the axle of the slide block is mounted in a carrier, which is guided in the machine frame to be longitudinally slidable while remaining parallel to itself, the mounting provided in the carrier for the axle is movable transversely to the direction of movement of the carrier and adapted to be fixed in position, said mounting is movable along the base of a triangle which has legs defined by the lever in its end positions, and the carrier has connected to it a lever, which remains parallel to itself and is adapted to transmit the movement to the welding device or to the film web. For transmitting motion, the lever may be connected to a carriage, which carries the welding device, or to a toothed belt or the like for raising and lowering the dancer rollers in mutually opposite senses.

In the apparatus according to the invention the influence of the known rocking slider crank mechanism is eliminated in that the path of the pivot of the slider crank is projected on a straight line, which constitutes the base of the triangles mentioned above. As a result, the motion and velocity ratios required for making bags of different sizes are proportional to each other.

Advantageous further developments of the invention are recited in the dependent claims.

Figure 2:
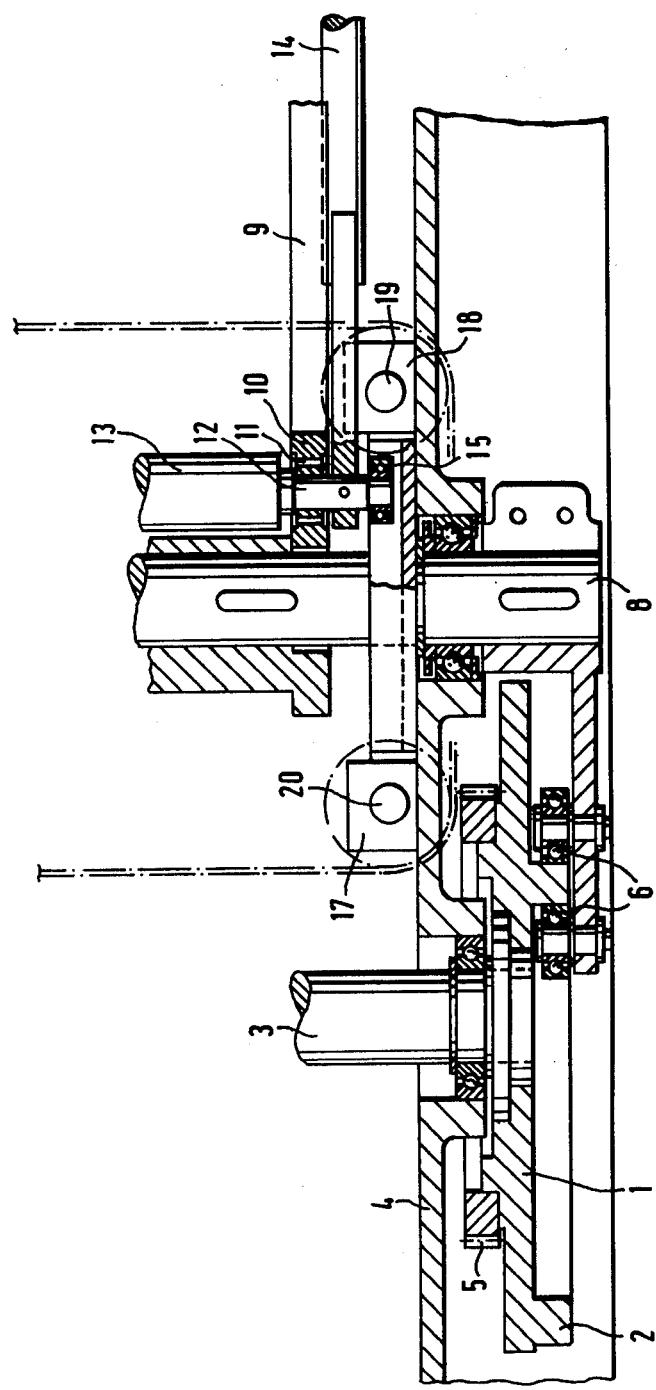
Figure 3:
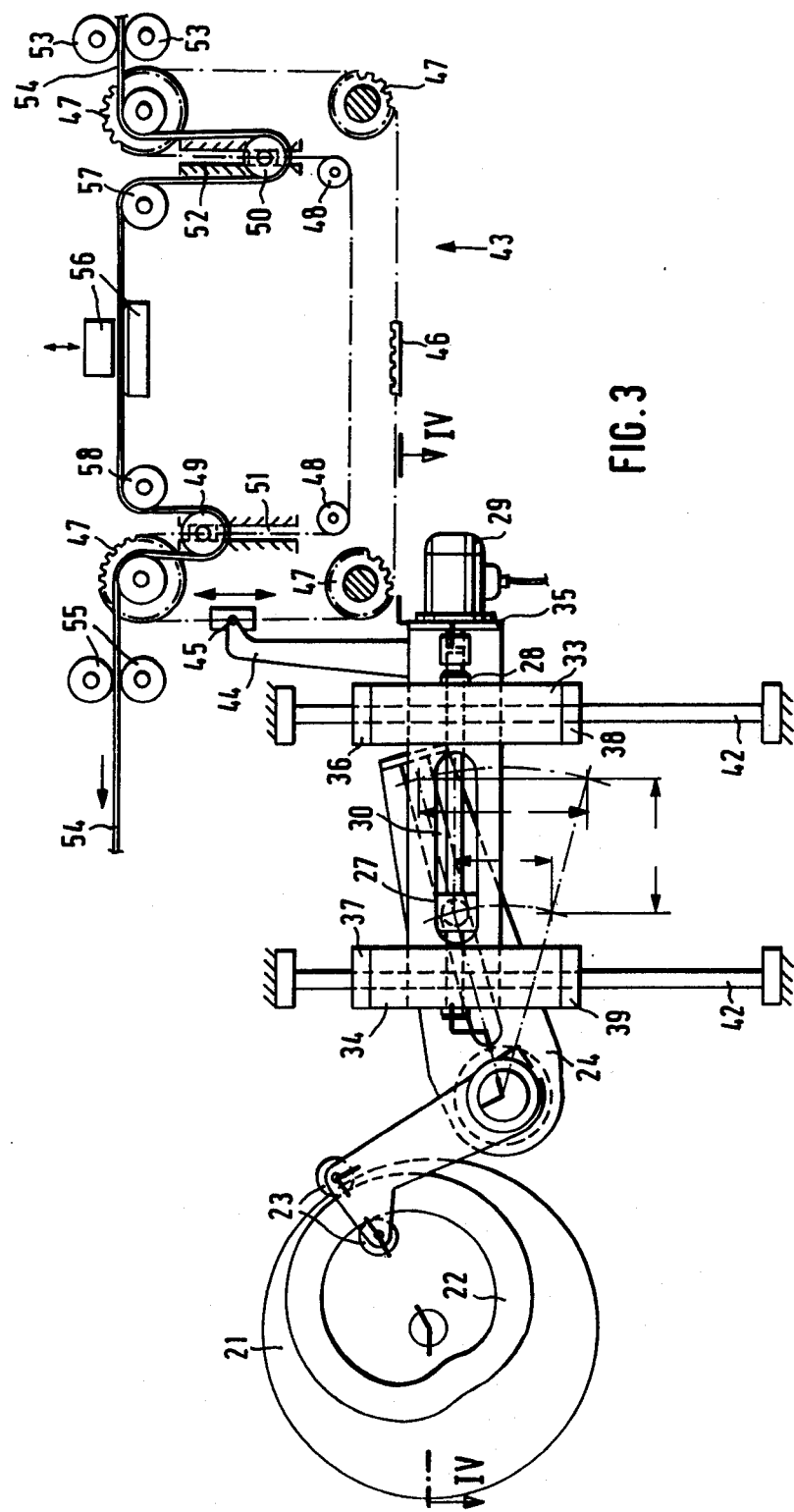
Figure 4:
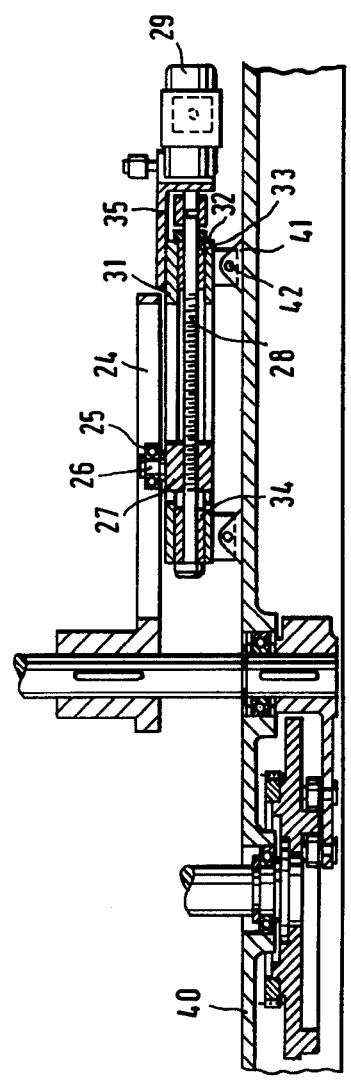

Two illustrative embodiments of the apparatus according to the invention will be described more fully hereinafter with reference to the drawing, in which FIG. 1 is a diagrammatic side elevation showing a slider crank mechanism for reciprocating a sealing carriage, FIG. 2 is a sectional view taken on line II—II in FIG. 1, FIG. 3 is a diagrammatic side elevation showing a camwheel mechanism for reciprocating a toothed belt for the control of dancer rollers and FIG. 4 is a sectional view taken on line IV—IV of FIG. 3.

In the embodiment shown in FIGS. 1 and 2, a camwheel 1 is provided with a cam rib 2. The camwheel 1 is carried by a timing shaft 3, which is rotatably mounted in a housing side wall 4. The camwheel is driven by a gear 5, which is disposed on the rear of the camwheel 1 and non-rotatably connected to it. A pair of cam follower rollers 6 are rotatably mounted on a cam follower lever 7 and roll on the cam rib 2. The cam follower lever 7 is keyed to a shaft 8, which like the timing shaft 3 is rotatably mounted in the housing side wall 4. A cam slot lever 9 is keyed to the shaft 8 at a distance from the cam follower lever 7 and has a cam slot, in which a slide block 10 is guided. The slide block 10 has a through bore 11, through which the journal 12 at one end of a shaft 13 protrudes. The shaft 13 serves only for synchronization because another cam slot lever is mounted on the continuous shaft 8 on that housing side wall which is opposite to the housing side wall 4.

The journal 12 protruding through the bore 11 carries a connecting rod 14 and a cam follower roller 15. The cam follower roller 15 is held in a straight track 16 so that only a straight-line motion can be transmitted by the cam follower roller 15 to the connecting rod 14 as a result of the oscillation of the cam slot lever 9 and the connecting rod 14 will remain parallel to itself in all phases of its motion. This arrangement thus eliminates any irregular motion which would be obtained if the slide block and/or the cam follower roller were not guided by a straight track.

As is particularly apparent from FIG. 1, the straight track is carried by two carriers 17 and 18, which are adapted to be lifted and lowered along tracks 19 and 20 by hydraulic piston-cylinder devices, not shown, when it is desired to change the size of the bags to be made. As the cam follower roller 15 will move on a straight line regardless of the bag size which has been selected, the motion ratios for the connecting rod 14 and for the sealing carriage 14', which is only diagrammatically indicated, will always be proportional. This would not be the case if the straight track 16 were omitted and the cam follower roller would move along an arc of a circle. In that case, cams having different rises would be required for different bag sizes so that a different cam rib would have to be used for each bag size if an optimum motion of the sealing carriage 14' were to be obtained.

In the embodiment shown in FIGS. 3 and 4, motion is not imparted to a sealing carriage but to the mountings for dancer or compensating rollers 49, 50. These mountings are moved along tracks 51, 52 of a roller frame 43 of a web-storing device. As in the embodiment shown in FIGS. 1 and 2, a cam slot lever 24 is cyclically oscillated by means of a camwheel 21, which is provided with a cam rib 22, and cam follower rollers 23 riding on said rib. A cam follower roller 25 is guided in the cam slot of the cam slot lever 24 and carries an axle 26, which at its free end is secured to a slide block 27. The latter is guided in another cam slot 30 and is movable along the latter by a screw 28, which is driven by a motor 29 for an adjustment of the bag size. The cam slot 30 consists of two milled slots in respective congruent plates 31 and 32, which are secured to opposite sides of carriers 33 and 34. Each of the carriers 33 and 34 has a through bore. In these through bores the screw 28 for adjusting the slide block 27 is guided and mounted. The motor 29 for driving the screw 28 is secured to a bracket 35, which is welded to the plate 31.

As is particularly apparent from FIG. 3, the carriers 33 and 34 comprise respective top lugs 36 and 37 and respective lower lugs 38 and 39, by which the carriers are guided on vertical guide rods 42 as the carriers 33 and 34 are raised and lowered. The guide rods 42 are secured to the side wall 40 by means of brackets 41. For the transmission of the motion to the roller frame 43, an arm 44 is firmly connected to the bracket 35 and is clamped by means of a clip 45 to an endless toothed belt 46, which is trained around four toothed pulleys 47 and two reversing pulleys 48. As is apparent from FIG. 3, the axes of two dancer rollers 49 and 50 are also secured to the toothed belt 43 and mounted in tracks 51 and 52, in which they can be raised and lowered.

The web 54 is continuously advanced by the pinch rollers 53 and is subsequently continuously stored by the roller 50 and simultaneously intermittently delivered by the roller 49 to the pinch rollers 55 in such a manner that the web is moved continuously at the same velocity before the pinch rollers 53 and behind the feed rollers 55 when viewed in the direction of travel. As the roller 50 is lowered and the roller 49 is raised, the sealing carriage 56 can be actuated to weld the web, which is held in position at this time between the reversing pulleys 57 and 58.

What is claimed is:

1. Apparatus for forming transverse seam welds or separated transverse seam welds in tubular or semitubular plastic film webs, preferably for making bags, comprising a transverse welding device having jaws which are adapted to be cyclically opened and closed and between which the film web is intermittently advanced when the jaws are open and is held in position during the welding times and a rocker lever, which by means of a cam slot and a slide block imparts to the transverse welding device or to the film web a movement in the same or opposite direction relative to each other, which movement is derived from a rotating eccentric cam wheel, characterized in that a first lever is provided with a straight radial track, a first slide block is longitudinally guided in said track and is connected by a common pivot to a second slide block, which is movable in a straight slide track, which constitutes the base of a triangle, the legs of which are defined by the lever in both of its end positions, the slide track is movable parallel to itself and adapted to be fixed in position in the machine frame, and one of the slide blocks has connected to it a second lever, which remains parallel to itself and is adapted to transmit the motion to the welding device or to the film web.

2. Apparatus according to claim 1, characterized in that the triangle defined by the first lever in its end positions is isosceles.

3. Apparatus according to claim 1, characterized in that the second lever consists of a link, by which an axle carrying the slide blocks is connected to a carriage, which is movable along the web and carries the welding device.

4. Apparatus according to claim 3, characterized in that the link is adapted to be increased or decreased in length in dependence on the position of the slide track.

5. Apparatus according to claim 1, characterized in that the slide track has guide bores and is slidably mounted on and adapted to be fixed to guide rods, which extend through guide bores of the slide track and are secured to the machine frame.

6. Apparatus according to claim 5, characterized in that drive means are provided for displacing the slide track along the guide rods.

7. Apparatus according to claim 1, characterized in that the first lever consists of a two-armed lever, one arm of which is provided with cam follower rollers, which are adapted to be pivotally moved by the cam, and the other arm of which is provided with the slide track for the slide block.

8. Apparatus according to claim 2, further comprising one arm carrying two cam follower rollers, which engage a revolving eccentric cam rib on opposite sides thereof, said eccentric cam rib provided on said cam.

9. Apparatus for forming transverse seam welds or separated transverse seam welds in tubular or semitubular plastic film webs, preferably for making bags, comprising a transverse welding device having jaws which are adapted to be cyclically opened and closed and between which the film web is intermittently advanced when the jaws are open and is held in position during the welding times and a rocker lever, which by means of a cam slot and a slide block imparts to the transverse welding device or to the film web a movement in the same or opposite direction relative to each other, which movement is derived from a rotating eccentric cam wheel, characterized in that a first lever is provided with a straight radial track, in which a slide block is longitudinally slidable, the axle of the slide block is mounted in a carrier, which is guided in the machine frame to be longitudinally slidable while remaining parallel to itself, a mounting provided in the carrier for the axle is movable transversely to the direction of movement of the carrier and adapted to be fixed in position, said mounting is movable along the base of a triangle which has legs defined by the first lever in its end positions, and the carrier has connected to it a second lever, which remains parallel to itself and is adapted to transmit the movement to the welding device or the film web.

10. Apparatus according to claim 9, characterized in that the second lever is connected to a toothed belt or the like element, which is adapted to raise and lower in mutually opposite directions two dancer rollers, which are mounted in a roller frame in two mutually parallel tracks so as to be adapted to be raised and lowered, whereby said toothed belt is adapted to intermittently hold the film web in position between the dancer rollers to permit the transverse seam welds to be formed.

11. Apparatus according to claim 9, characterized in that a screw which is operable by drive means is provided for adjusting the mounting in a bracket.

12. Apparatus according to claim 11, characterized in that the bracket is slidably mounted on guide rods, which are parallel to each other.

* * * * *